Figure 1:
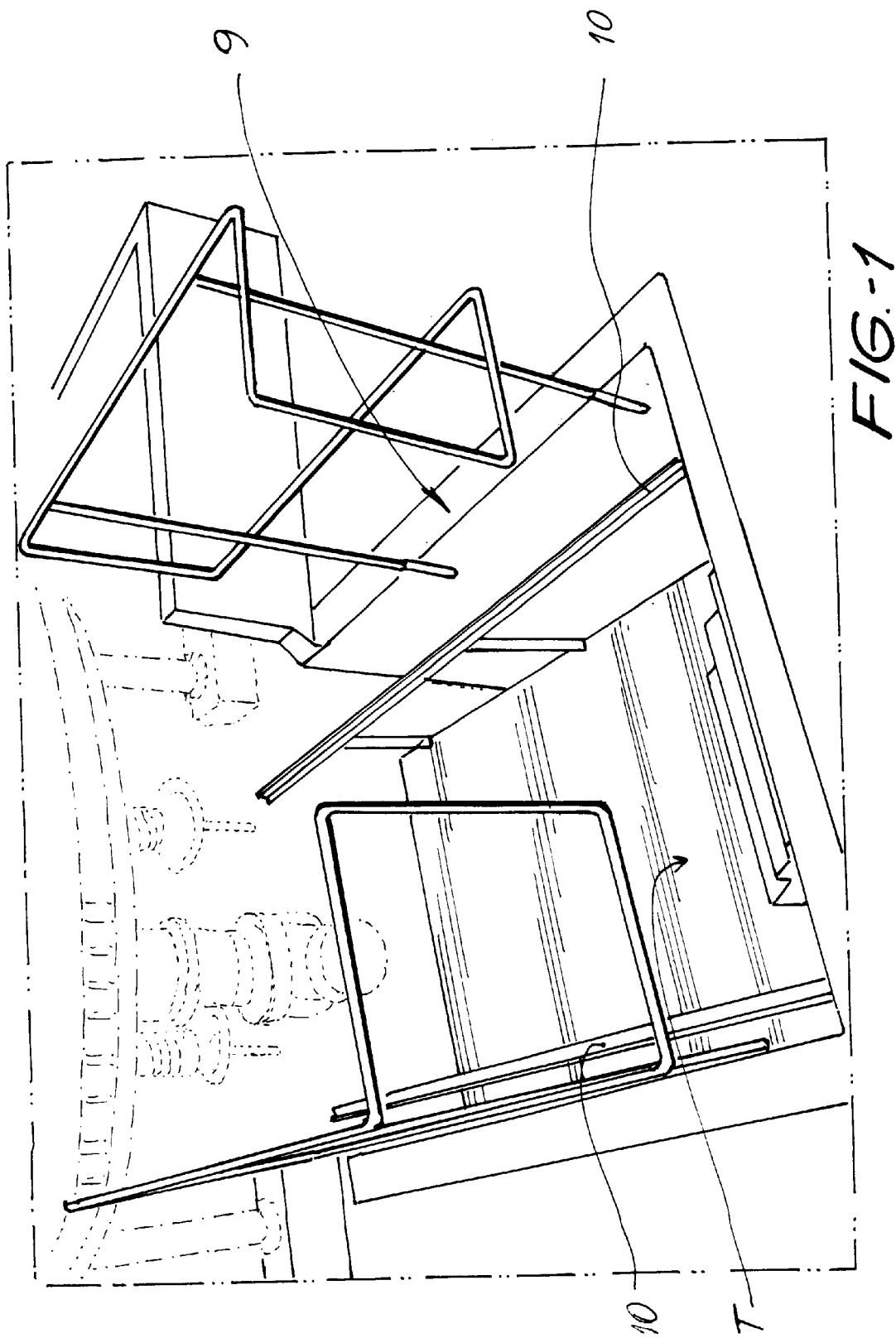

United States Patent

Gonçalves et al.

[11] Patent Number: 6,115,896
[45] Date of Patent: Sep. 12, 2000

[54] MAINTENANCE DEVICE FOR FLAT FILTER HEAD VALVES

[75] Inventors: Herlon Quintão Gonçalves; Nelson Aparecido Sena; José Geraldo Silva; Eduardo Silva; Luiz De Souza Ferreira; Eloi Dutra, all of Itabira-Minas Gerais, Brazil

[73] Assignee: Companhia Vale Do Rio Doce, Minas Gerais, Brazil

[21] Appl. No.: 09/174,772

[22] Filed: Oct. 19, 1998

[30] Foreign Application Priority Data

May 5, 1998 [BR] Brazil ................................ 7800560 U

[51] Int. Cl.[7] ........................................... B66F 3/00
[52] U.S. Cl. ..................... 29/221.6; 29/213.1; 29/281.4; 269/17
[58] Field of Search .................... 29/221.6, 214, 29/213.1, 281.4; 254/133 R, DIG. 16, 134; 414/10; 269/17, 43

[56] References Cited

U.S. PATENT DOCUMENTS

| | | | |
|---|---|---|---|
| 2,627,109 | 2/1953 | Bock et al. | 269/17 |
| 5,127,638 | 7/1992 | Kent | 269/17 |
| 5,184,653 | 2/1993 | Lacy | 269/17 |
| 5,632,475 | 5/1997 | McCanse | 254/134 |

*Primary Examiner*—Robert C. Watson
*Attorney, Agent, or Firm*—Helfgott & Karas, PC

[57] ABSTRACT

A maintenance device for flat filter head valves, comprising a metallic structure (1) having an upper flange (2), which is supported and connected by structural components (5) on a support frame (6), from which derive four supporting legs (7) having respective wheels (8) in the lower ends thereof. The device is formed as a small car (11) to be positioned over tracks (10) at the time the component to be subjected to maintenance procedures is removed, and it can be removed from the work area (T) of base structure (9) later on.

6 Claims, 2 Drawing Sheets

MAINTENANCE DEVICE FOR FLAT FILTER HEAD VALVES

The present specification relates to a maintenance device for flat filter head valves that was developed to facilitate the maintenance procedures of flat filter head valves, mainly on plane filters of the 6 m² type and/or the like.

As is known by the those skilled in the art, mining activities require several equipment with specific purposes among which is a special type of filter defined as flat filter, the head valve of which should undergo maintenance procedures from time to time.

The maintenance operations of the said equipment present drawbacks associated to the filter assembling or base structures as a whole, among which the difficulty in removing said head valve, the limited access to the same and unsuitable ergonomic spacings could be mentioned.

Such undesirable aspects increase the time required for the maintenance of the component, and consequently the idle time of the equipment (filter) as a whole, thus also imposing a negative influence on the control operations to be carried out from time to time.

In this context, and having in mind that suitable equipment are not available for said maintenance operations of said component, they invariably use precarious improvised removal techniques the result of which is a high unsafety level in the operation and can even result in accidents with serious consequences.

The present techniques for removing the disclosed head valve employ a 'U-shaped' beam as a supporting component, which beam is manually positioned over the component so that it is drawn off the filter base structure, a task that requires the workers involved to make a high physical effort.

An object of the present invention is to provide a maintenance device for flat filter head valves that allows for a substantial improvement in the conditions of maintenance operations and control of said equipment.

Another object of the present invention is to provide a maintenance device for flat filter head valves that due to its special construction makes it possible for said component removal operations to take place very quickly such as in an average period of time of 66% lower than usual.

Another object of the present invention is to provide a maintenance device for flat filter head valves that allows for a safe removal that requires a minimum physical effort to the accomplishment thereof.

Another object of the present invention is to provide a maintenance device for flat filter head valves that could be easily produced at a significantly lower cost.

Figure 2:
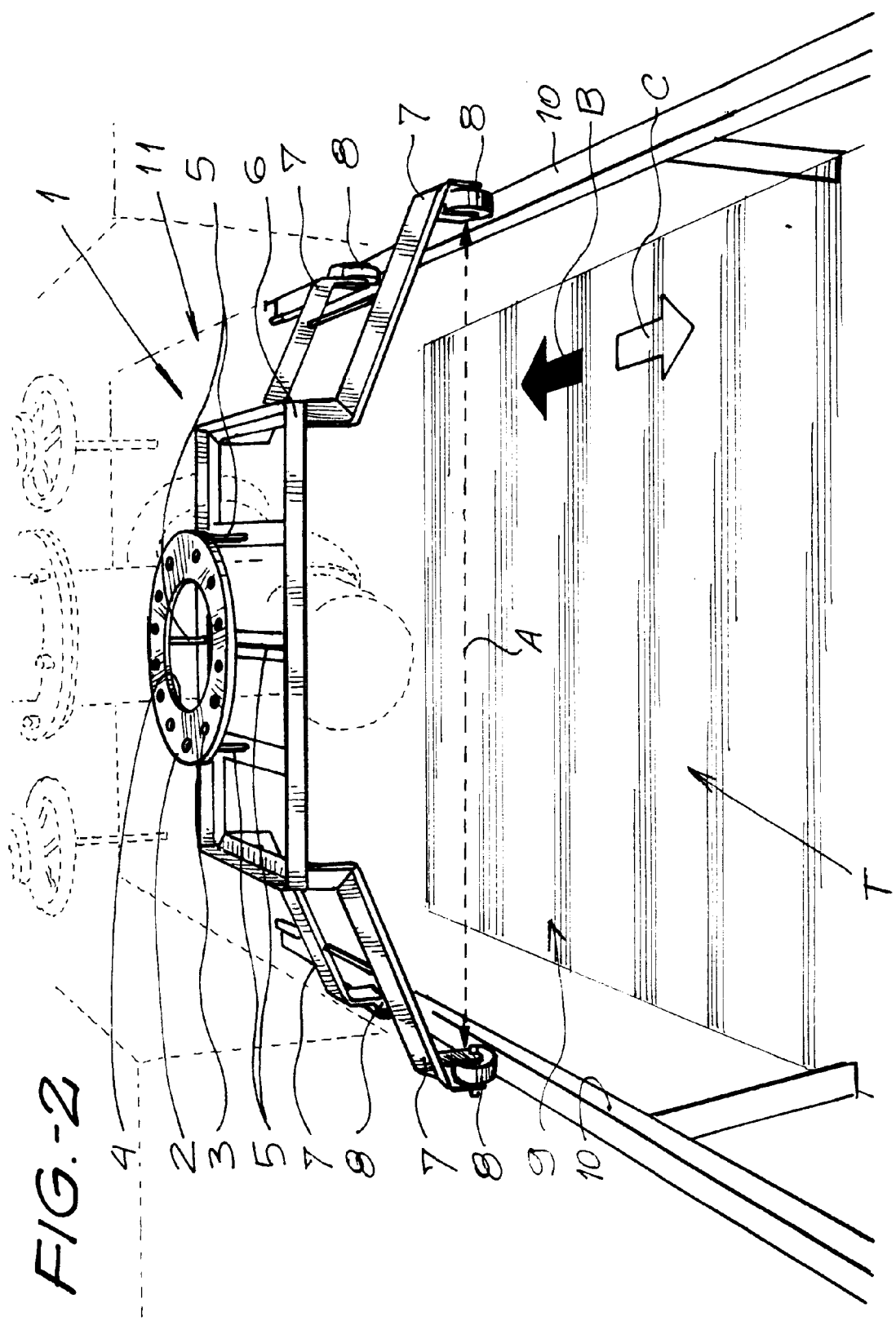

These and other objects and advantages of the present invention will be evident from the description based on the following drawings; in which FIG. 1 is a perspective view of the area defined as the filter base structure, through which the operation for removing its head valve for later maintenance is carried out; and FIG. 2 is another perspective view wherein the maintenance device for flat filter head valves is shown in its operational position close to the head valve to be removed.

According to these drawings, the maintenance device for flat filter head valves according to the present invention is covered by a metallic structure 1, which is defined by an upper flange 2 having a shape consistent with the component of the equipment to be removed, said upper flange 2 also being provided with several radially disposed holes 3 and a concentric circular aperture 4.

Upper flange 2 is raised from suitably supported on and interconnected by structural components 5 to a support frame 6, from which derive four supporting legs 7 having respective wheels 8 in the lower ends thereof.

Supporting legs 7 have a hole dimension 'A' that stabilizes the weight of the component the device will support, and it also allows same to be assembled on base structure 9, a pair of tracks 10 over which the device is displaced according to the direction shown by arrows 'B' and 'C' of FIG. 2.

The proposed device is formed as a small car, which is easily positioned over tracks 10 at the time the removal of the component takes place, small car 11 being removed later on, thus leaving the work area 'T' of base structure 9 clear.

In view of its constructivity, the maintenance device for flat filter head valves allows the removal of the head valve to be carried out with a minimal physical effort, in a way fully consistent with ideal safety levels and in a substantially short period of time if compared to the time presently required for the same task.

It should be emphasized that the present maintenance device for flat filter head valves could be the object of several adjustments that will not change the scope of the originally claimed subject if actually made thereto.

What is claimed is:

1. A device to aid in the removal and maintenance of flat filter head valves, comprising: a metallic structure (1) defined by an upper flange (2) having a shape consistent with the flat filter head valve to be removed, said upper flange (2) being provided with a plurality of radially disposed holes (3) and a concentric circular aperture (4); wherein upper flange (2) is raised from supported on and connected to a support frame (6) by a plurality of structural components (5), from which derive four supporting legs (7) having respective wheels (8) in the lower ends thereof; said wheels being adapted to ride along a pair of tracks (10) disposed on a base structure (9).

2. The device according to claim 1, wherein supporting legs (7) of the support frame (6) are provided with a hole (A) dimensioned to stabilize the weight of the flat filter head valve to be supported by the device.

3. The device according to claim 1, wherein the device is adapted to be removably positioned over said tracks (10) at the time the removal of the flat filter head valve to be subjected to maintenance procedures, said tracks (10) being raised from said base structure (9) to define a work area (T).

4. A device according to claim 1, wherein said legs (7) extend downwardly and outwardly from said support frame (6).

5. A device according to claim 2, wherein said legs (7) extend downwardly and outwardly from said support frame (6).

6. A device according to claim 1, wherein said upper flange (2) is adapted to support head valves of 6 m² plane filters.

* * * * *